(12) United States Patent
Shen et al.

(10) Patent No.: US 12,166,525 B2
(45) Date of Patent: Dec. 10, 2024

(54) FIBER DEPLOYMENT METHOD, STORAGE MEDIUM, ELECTRONIC DEVICE AND SYSTEM

(71) Applicant: SOOCHOW UNIVERSITY, Suzhou (CN)

(72) Inventors: Gangxiang Shen, Suzhou (CN); Hao Yang, Suzhou (CN); Yongcheng Li, Suzhou (CN); Ningning Guo, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/912,557

(22) PCT Filed: Jul. 19, 2021

(86) PCT No.: PCT/CN2021/107010
§ 371 (c)(1),
(2) Date: Sep. 19, 2022

(87) PCT Pub. No.: WO2022/217770
PCT Pub. Date: Oct. 20, 2022

(65) Prior Publication Data
US 2023/0361872 A1    Nov. 9, 2023

(30) Foreign Application Priority Data

Apr. 13, 2021    (CN) .......................... 202110393834.3

(51) Int. Cl.
*H04B 10/079* (2013.01)
*H04Q 11/00* (2006.01)

(52) U.S. Cl.
CPC ..... *H04B 10/0793* (2013.01); *H04Q 11/0005* (2013.01)

(58) Field of Classification Search
CPC .......... H04B 10/0793; H04B 10/07953; H04B 10/07951; H04B 10/0795; H04B 10/0799;
(Continued)

(56) References Cited

U.S. PATENT DOCUMENTS 10,225,008 B1    3/2019    Vassilieva et al.
10,911,138 B2*   2/2021    Shen ..................... H04L 45/123
(Continued)

FOREIGN PATENT DOCUMENTS

CN    104836736 A    8/2015
CN    106487685 A    3/2017
(Continued)

OTHER PUBLICATIONS

Strategies and Benefits of Deploying Ultralow-Loss Fiber Links in an Elastic Optical Network (Year: 2019).*
(Continued)

*Primary Examiner* — Hibret A Woldekidan
(74) *Attorney, Agent, or Firm* — SZDC Law PC

(57) ABSTRACT

The present invention provides a fiber deployment method, storage medium, electronic device and system. The fiber deployment method includes the following steps: S10, traversing all single-mode fiber links and selecting a link for ultra-low loss fiber upgrade with the objective of minimizing the maximum number of frequency slots used in the whole network; and S20, when both an ultra-low loss fiber and a single-mode fiber satisfy the service demand, using preferentially spectrum resources in the single-mode fiber. The fiber deployment method of the present invention is simple and feasible. It allows a more efficient fiber upgrade strategy and more reasonable spectrum resource allocation and can make full use of the existing single-mode fibers in the elastic optical network, thereby allowing more efficient resource utilization.

6 Claims, 3 Drawing Sheets

(58) Field of Classification Search
CPC .............. H04B 10/0773; H04B 10/073; H04B 10/079; H04B 10/0791; H04B 10/0775; H04Q 11/0005; H04J 14/0267
See application file for complete search history.

(56) References Cited

U.S. PATENT DOCUMENTS

2013/0209107 A1* 8/2013 Stead ................. H04B 10/2575
398/116
2018/0138972 A1* 5/2018 Shen ................... H04J 14/0267

FOREIGN PATENT DOCUMENTS

CN   108199881 A   6/2018
CN   113114365 A   7/2021

OTHER PUBLICATIONS

Hao Yang et al., "Deploying Ultra-Low Loss Fibers for Enhancing Lightpath Provisioning Performance in an Elastic Optical Network" 2021 Optical Fiber Communication Conference and Exhibition (OFC), part 4 (Jun. 10, 2021).
Yongcheng Li et al., "Strategies and Benefits of Deploying Ultralow-Loss Fiber Links in an Elastic Optical Network" Journal of Optical Communications and Networking, vol. 11, issue 5, pp. 243-245 (May 17, 20119).

* cited by examiner traversing all single-mode fiber links and selecting a link for ultra-low loss fiber upgrade with the objective of minimizing the maximum number of frequency slots used in the whole network. — S10 when both an ultra-low loss fiber and a single-mode fiber satisfy the service demand, using preferentially spectrum resources in the single-mode fiber. — S20

FIBER DEPLOYMENT METHOD, STORAGE MEDIUM, ELECTRONIC DEVICE AND SYSTEM

This application is the National Stage Application of PCT/CN2021/107010, filed on Jul. 19, 2021, which claims priority to Chinese Patent Application No. 202110393834.3, filed on Apr. 13, 2021, which is incorporated by reference for all purposes as if fully set forth herein.

FIELD OF THE INVENTION

The present invention relates to the technical field of piezoelectric sensing, and more particularly to a fiber deployment method, storage medium, electronic device and system.

DESCRIPTION OF THE RELATED ART

With the increasing development of optical channel high-order modulation technology, optical channel services with transmission rate of 400G or even 1T have appeared. However, in a network based on traditional standard single-mode fibers (SSMFs), due to the high optical signal-to-noise ratio required by high-order modulation format, the transmission distance without repeaters in the optical channel will be shortened with increasement of the transmission rate, which can't meet the requirements of ultra-high speed and ultra-long distance for optical transmission in the future. It is necessary to lay or upgrade with new fibers having lower loss and better performance. Ultra-low loss fiber (ULL) is regarded as the first choice for ultra-high-speed transmission because its loss is much lower than that of the traditional standard single-mode fiber, which can greatly increase the transmission distance of 400G or even 1T high-speed optical channels, and it has attracted wide attention from industry and academia. At the same time, China's legacy fibers laid in 1990s are about to expire and need to become out of service or be replaced, thereby providing an opportunity for the practical use of ultra-low loss fiber with better performance in the optical network, which will become an inevitable trend.

If an ultra-low loss fiber is to be laid in the existing network, the existing standard single-mode fiber will have to coexist with the newly laid ultra-low loss fiber. At present, researches have been made on ultra-low loss fiber hybrid networking. Specifically, with respect to optimization of the topology of ultra-low loss fiber hybrid networking, Reference [1] builds an optical channel signal quality evaluation model based on hybrid fiber links, proposes an efficient link upgrade strategy, optimizes the maximum number of frequency slots used in the network and the performance of optical channel service blocking, and reveals an important phenomenon that the trend of improvement in network performance tends to be saturated with the decrease of attenuation coefficient of ultra-low loss fibers. With respect to multi-cycle ultra-low loss fiber link upgrade, Reference [2] defines a quantitative index to evaluate the process of ultra-low loss fiber link upgrade, proposes an efficient fiber link upgrade strategy, and optimizes the overall resource utilization efficiency in the network during the fiber link upgrade process.

All the researches mentioned above are made based on the premise of replacing original standard single-mode fibers with ultra-low loss fibers. Specifically, if the deployment of ultra-low loss fibers has been completed in the link, the link will no longer use the original standard single-mode fibers to bear the service traffic, which is a great waste of the spectrum resources of the original standard single-mode fibers in the optical network.

[1] Guan Y, Jiang H, Gao M, et al. Migrating Elastic Optical Networks from Standard Single-Mode Fibers to Ultra-low loss Fibers: Strategies and Benefits[C]//OFC 2017. Los Angeles, USA: OSA, 2017: W4H.3.

[2] Li Y, Chen W, Bose S K, et al. Efficient Multi-Stage Deployment of Ultra-low loss Fibers in Elastic Optical Networks[J]. IEEE/OSA Journal of Lightwave Technology, 2020, 38(14): 3542-3552.

SUMMARY OF THE INVENTION

The present invention is intended to provide a fiber deployment method that allows a more efficient upgrade strategy and more reasonable spectrum allocation.

To address the problem mentioned above, the present invention provides a fiber deployment method, including:

S10: traversing all the single-mode fiber links and selecting a link for ultra-low loss fiber upgrade with the objective of minimizing the maximum number of frequency slots used in the whole network; and S20: when both the ultra-low loss fiber and the single-mode fiber satisfy the service demand, using preferentially the spectrum resource in the single-mode fiber.

In a preferable embodiment of the present invention, the step S10 specifically includes:

S11: traversing all the single-mode fiber links, adding for simulation an ultra-low loss fiber on each single-mode fiber link to be upgraded, and calculating the maximum number of frequency slots; and S12: based on all the traversal results, selecting the single-mode fiber link having the lowest maximum number of frequency slots for preferential ultra-low loss fiber upgrade.

In a preferable embodiment of the present invention, the step S20 specifically includes:

S21: selecting a modulation format m from a modulation format set M;

S22: calculating the number of frequency slots required for establishing a light path based on m and creating a SWP list; for each SWP list, preferentially adding an idle single-mode fiber as a virtual link; and if the single-mode fiber on a certain link is not idle, then adding an idle ultra-low loss fiber on this link as a virtual link;

S23: finding a router R in each SWP, and if there is R≠NULL, then entering the step S24;

S24: calculating the OSNR value of this R, and if the OSNR value of R satisfies the OSNR threshold defined by the current modulation format m, letting R*=R and proceeding to the step S26, otherwise checking whether there is a coexisting idle ultra-low loss fiber on the link in which the single-mode fiber on the router R is situated, and if so, replacing the single-mode fibers on R one by one with the ultra-low loss fibers and calculating the updated OSNR value of R after each replacement, and if after a certain replacement step, the OSNR value of R satisfies the OSNR threshold of the modulation format m, stopping the replacement and letting R*=R, and then proceeding to the step S26; if all the idle ultra-low loss fibers in the current SWP list have been replaced with but the OSNR value of R still does not satisfy the OSNR required by the modulation format m, then proceeding to the next SWP list; and if no available R is found in any of the SWP lists, then proceeding to the step S25;

S25: determining whether m is the last modulation format in M, and if so, proceeding to the step S26, otherwise updating m to the next modulation format in M and returning to the step S22; and S26: if R*≠NULL, then establishing a light path around R*, otherwise blocking the service request.

In a preferable embodiment of the present invention, the step S23 specifically includes:

in each SWP, finding the router R by using the shortest routing algorithm at the search cost of 1/OSNR value for each virtual link.

In a preferable embodiment of the present invention, the OSNR is calculated by the equation of:

$$OSNR = \frac{P_{TX}}{P_{ASE} + P_{NLI}}$$

where $P_{TX}$ is the optical channel signal transmit power, $P_{ASE}$ is the ASE noise and $P_{NLI}$ is the noise produced by nonlinear effects.

In a preferable embodiment of the present invention, the modulation format set M∈ {64-QAM, 32-QAM, 16-QAM, 8-QAM, QPSK, BPSK}.

The present invention further provides a computer-readable storage medium including programs stored therein that perform the fiber deployment method according to any one of the aspects described above.

The present invention further provides an electronic device including: one or more processors, a memory, and one or more programs stored in the memory and configured to be exerted by the one or more processors to perform the fiber deployment method according to any one of the aspects described above.

To address the problem mentioned above, the present invention further provides a fiber deployment system including:

a fiber deployment module configured to traverse all the single-mode fiber links and select a link for ultra-low loss fiber upgrade with the objective of minimizing the maximum number of frequency slots used in the whole network; and a spectrum resource allocation module configured to, when both the ultra-low loss fiber and the single-mode fiber satisfy the service demand, use preferentially the spectrum resource in the single-mode fiber.

In a preferable embodiment of the present invention, the fiber deployment module includes:

a maximum frequency slot number calculation module configured to traverse all the single-mode fiber links, add for simulation an ultra-low loss fiber on each single-mode fiber link to be upgraded, and calculate the maximum number of frequency slots; and a fiber upgrade module configured to, based on all the traversal results, select the single-mode fiber link having the lowest maximum number of frequency slots for preferential ultra-low loss fiber upgrade.

The present invention has the following beneficial effects.

The fiber deployment method of the present invention is simple and feasible. It allows a more efficient fiber upgrade strategy and more reasonable spectrum resource allocation and can make full use of the existing single-mode fibers in the elastic optical network, thereby allowing more efficient resource utilization.

The above description is only a summary of the technical solution of the present invention. In order to understand the technical means of the present invention more clearly and implement it according to the contents of the description and to make the above and other objects, features and advantages of the present invention more obvious and understandable, preferred embodiments will be described hereinafter in detail with reference to the accompanying drawings.

DETAILED DESCRIPTION OF THE PREFERRED EMBODIMENTS

The invention will be further explained with reference to the following drawings and particular embodiments, so that those skilled in the art can better understand the invention and implement it. However, the listed embodiments should not be taken as limitation of the invention.

Figures 1, 2:
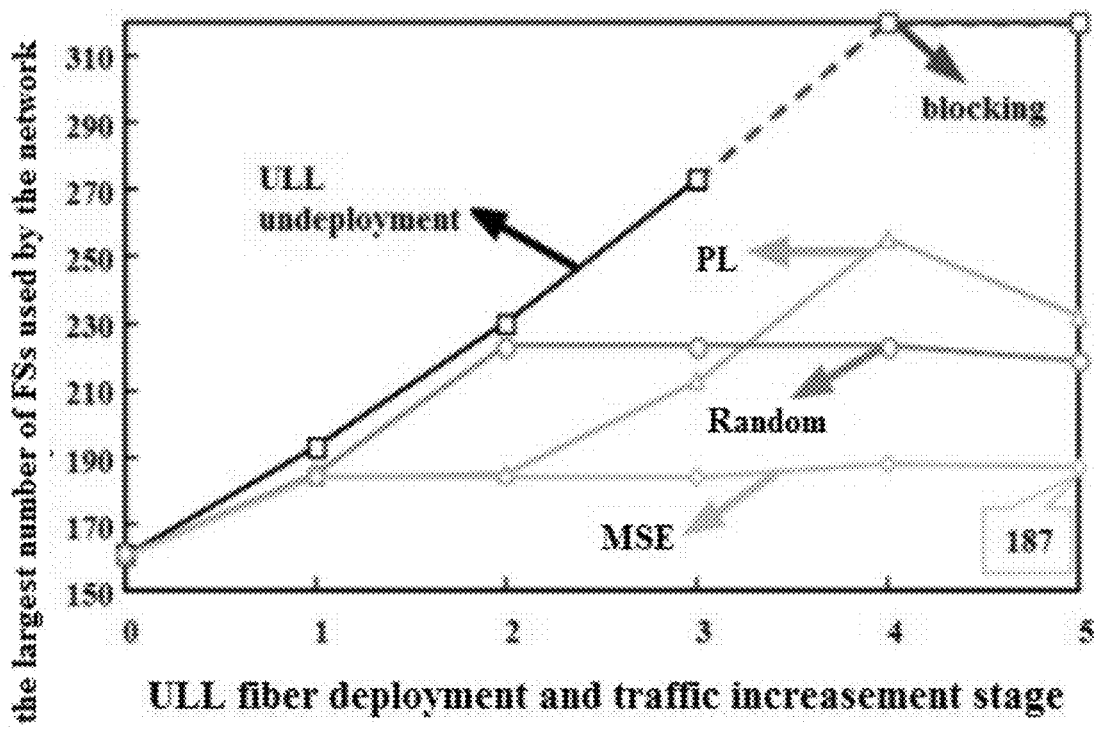
FIG. 1 is a flowchart of a fiber deployment method according to a preferred embodiment of the present invention.
FIG. 2 is a diagram showing the comparison of performance between three upgrade strategies in a n6s9 network according to a preferred embodiment of the present invention.

As shown in FIG. 1, a preferred embodiment of the present invention discloses a fiber deployment method including the following steps.

S10: traversing all the single-mode fiber links and selecting a link for ultra-low loss fiber upgrade with the objective of minimizing the maximum number of frequency slots used in the whole network.

S20: when both the ultra-low loss fiber and the single-mode fiber satisfy the service demand, using preferentially the spectrum resource in the single-mode fiber.

Optionally, the step S10 specifically includes the following steps.

S11: traversing all the single-mode fiber links, adding for simulation an ultra-low loss fiber on each single-mode fiber link to be upgraded, and calculating the maximum number of frequency slots.

S12: based on all the traversal results, selecting the single-mode fiber link having the smallest maximum number of frequency slots for preferential ultra-low loss fiber upgrade.

Optionally, the step S20 specifically includes the following steps.

S21: selecting a modulation format m from a modulation format set M; Optionally, the modulation format set M∈ {64-QAM, 32-QAM, 16-QAM, 8-QAM, QPSK, BPSK}.

S22: calculating the number of frequency slots required for establishing a light path based on m and creating a SWP list; for each SWP list, preferentially adding an idle single-mode fiber as a virtual link; and if the single-mode fiber on a certain link is not idle, then adding an idle ultra-low loss fiber on this link as a virtual link.

S23: finding a router R in each SWP, and if there is R≠NULL, then entering the step S24.

S24: calculating the OSNR value of the R, and if the OSNR value of R satisfies the OSNR threshold defined by the current modulation format m, letting R*=R and proceeding to the step S26, otherwise checking whether there is a coexisting idle ultra-low loss fiber on the link on which the single-mode fiber on the router R is situated, and if so, replacing the single-mode fibers on R one by one with the ultra-low loss fibers and calculating the updated OSNR value of R after each replacement, and if after a certain replacement step, the OSNR value of R satisfies the OSNR threshold of the modulation format m, stopping the replacement and letting R*=R, and then proceeding to the step S26; if all the idle ultra-low loss fibers in the current SWP list have been replaced, but the OSNR value of R still does not satisfy the OSNR required by the modulation format m, then proceeding to the next SWP list; and if no available R is found in any of the SWP lists, then proceeding to the step S25. The initial idle router R*=NULL.

S25: determining whether m is the last modulation format in M, and if so, proceeding to the step S26, otherwise updating m to the next modulation format in M and returning to the step S22.

S26: if R*≠NULL, then establishing a light path around R*, otherwise blocking the service request.

Optionally, the step S23 specifically includes:

in each SWP, finding the router R by using the shortest routing algorithm at the search cost of 1/OSNR value for each virtual link.

The amplified spontaneous emission (ASE) noise of the optical amplifier and the nonlinear effect of optical transmission are the main causes of light path signal attenuation. To estimate the accumulated ASE noise of each light path, it is assumed that the amplifiers on each link are placed equidistantly and the power loss of the optical signal can be completely compensated. Further, the nonlinear effect is modeled as additive Gaussian noise which is independent of ASE noise. Based on the assumption above, the ASE noise and the nonlinear noise can be summed linearly in calculation of the OSNR to obtain the following equation for calculating the OSNR:

$$OSNR = \frac{P_{TX}}{P_{ASE} + P_{NLI}}$$

where $P_{TX}$ is the optical channel signal transmit power, $P_{ASE}$ is the ASE noise and $P_{NLI}$ is the noise produced by nonlinear effects. Specifically, $P_{ASE}$ and $P_{NLI}$ are calculated by the equations in the document [3], which shall not be described again here.

A preferred embodiment of the present invention further provides a computer-readable storage medium including programs stored thereon that perform the fiber deployment method according to any one of the aspects described above.

A preferred embodiment of the present invention further provides an electronic device including: one or more processors, a memory, and one or more programs stored in the memory and configured to be exerted by the one or more processors to perform the fiber deployment method according to any one of the aspects described above.

A preferred embodiment of the present invention further provides a fiber deployment system including:

a fiber deployment module configured to traverse all the single-mode fiber links and select a link for ultra-low loss fiber upgrade with the objective of minimizing the maximum number of frequency slots used in the whole network; and a spectrum resource allocation module configured to, when both the ultra-low loss fiber and the single-mode fiber satisfy the service demand, use preferentially the spectrum resource in the single-mode fiber.

The fiber deployment module includes:

a maximum frequency slot number calculation module configured to traverse all the single-mode fiber links, add for simulation an ultra-low loss fiber on each single-mode fiber link to be upgraded, and calculate the maximum number of frequency slots; and a fiber upgrade module configured to, based on all the traversal results, select the single-mode fiber link having the smallest maximum number of frequency slots for preferential ultra-low loss fiber upgrade.

The method in this fiber deployment system is the same as the fiber deployment method in the embodiment above and shall not be described again here.

The fiber deployment method and system of the present invention are simple and feasible, allow a more efficient fiber upgrade strategy and more reasonable spectrum resource allocation, and can make full use of the existing single-mode fibers in the elastic optical network, thereby allowing more efficient resource utilization.

To evaluate the fiber deployment method and system of the present invention, simulation tests are performed in two types of networks, i.e. a network including 6 nodes and 9 links (n6s9) and a US Backbone Network (USNET) including 24 nodes and 43 links. Each link in these networks only has legacy single-mode fibers (SSMFs) before deployment of ultra-low loss fibers (ULLs). In the present invention, SMF-28 ULL fibers from Corning are used for upgraded deployment of links. This fiber has a loss of merely 0.168 dB/km, while SSMF has a loss of 0.25 dB/km. Each fiber link has 320 frequency slots each having a bandwidth of 12.5 GHz. Six modulation formats are used in establishing the light path. To simulate a real network environment, it is assumed that the service traffic in the simulation environment is constantly increasing. Before deployment of the ULL fibers, it is assumed that 400 light paths have been established in the test network, each light path having a traffic distributed randomly between [10, X] Gb/s. X is 200 in the n6s9 network and 400 in the USNET network. These light paths cause 50% spectrum resources in the network to be occupied. It is assumed that the whole network is upgraded in 5 phases of fiber deployment, the service traffic is increased by 20% and 20% ULL fiber links is deployed in each phase. There are two scenarios:

Scenario I: in establishing a new light path, the network is not permitted to reconstruct the light path that has been previously established. FIG. 2 shows the results of ULL fiber deployment in n6s9. Three strategies for deploying ULL fibers in the link are adopted: (1) Physical Length-based (PL) strategy: sorting the network links in descending order of physical length, then selecting a link in sequence for ULL fiber deployment; (2) random strategy: randomly generating the sequence of links for ULL fiber deployment; and (3) Maximum Spectral Efficiency (MSE) strategy, i.e., the step S10 in the present invention.

Figure 3:
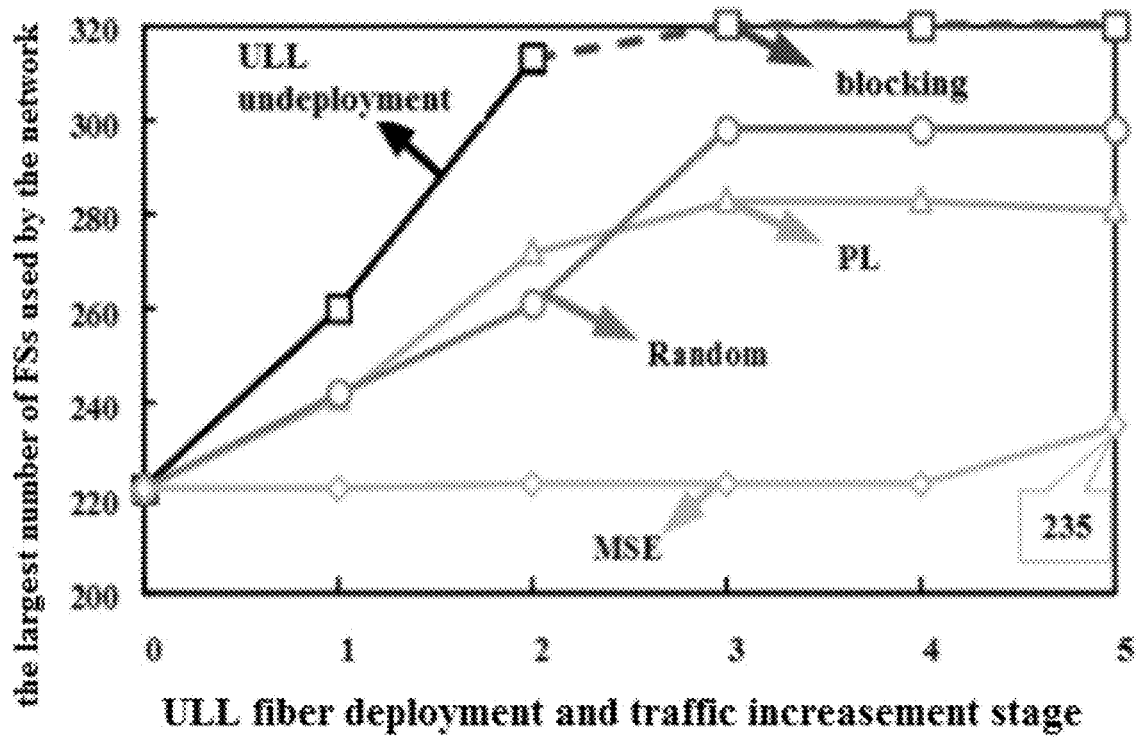
FIG. 3 is a diagram showing the comparison of performance between three upgrade strategies in a USNET network according to a preferred embodiment of the present invention.

First, it is noted that with increasement of traffic demand in a later stage, the number of FSs used by the network is also constantly increasing. Second, the scenario of ULL fiber deployment shows higher spectrum resource utilization, in which less FSs are needed than the scenario without ULL fiber deployment. For the latter scenario, when the traffic is increased to a certain extent, it may happen that service blocking occurs and light paths cannot be built. Third, the three ULL fiber deployment strategies are compared. It is noted that, the MSE deployment strategy is the most efficient, since it occupies the least FSs while the other two strategies, the PL and Random strategies, always occupy more FSs. This phenomenon occurs because the MSE strategy is more advanced in that it scans fiber upgrade in all the links in advance and preferentially selects the link that occupies the least FSs after the phase of deployment for upgrade. Similar simulation is made to USNET and the results are shown in FIG. 3. Similar to n6s9, the MSE strategy has the best performance among the three strategies. The scenario of ULL fiber deployment always needs less FSs than the scenario where ULL fiber deployment is not applicable.

Figure 4:
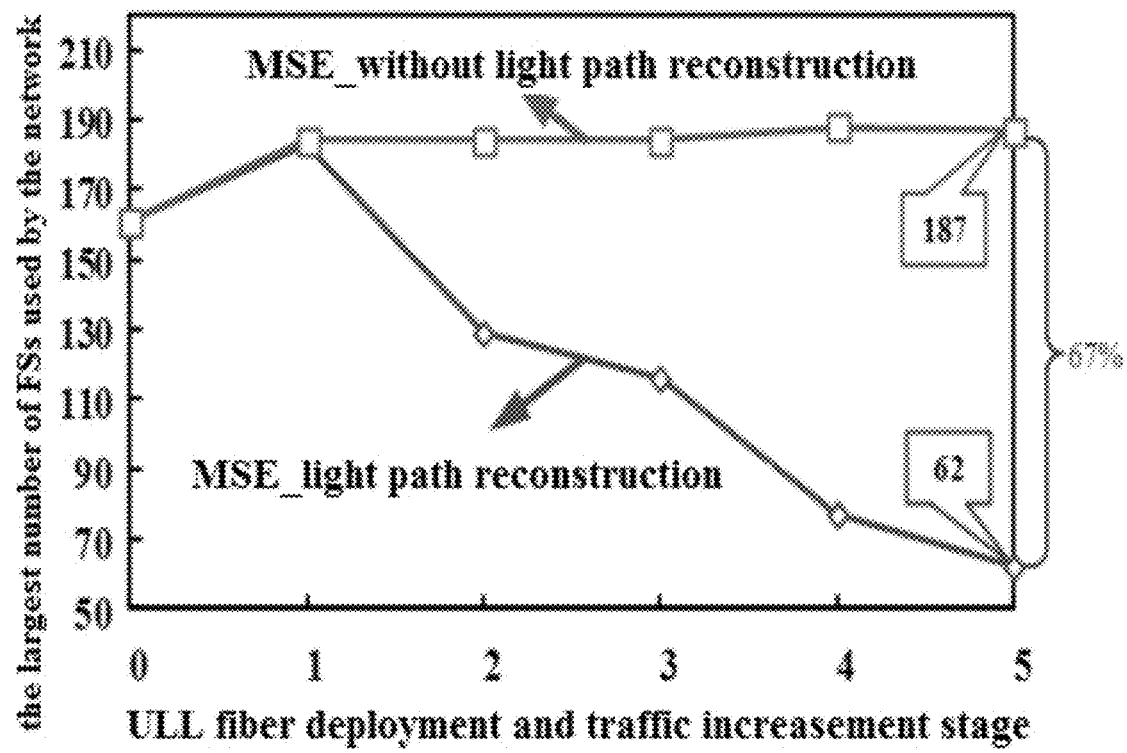
FIG. 4 is a diagram showing the difference in performance between the scenario with light path reconstruction and the scenario without light path reconstruction in a n6s9 network according to a preferred embodiment of the present invention.
Figure 5:
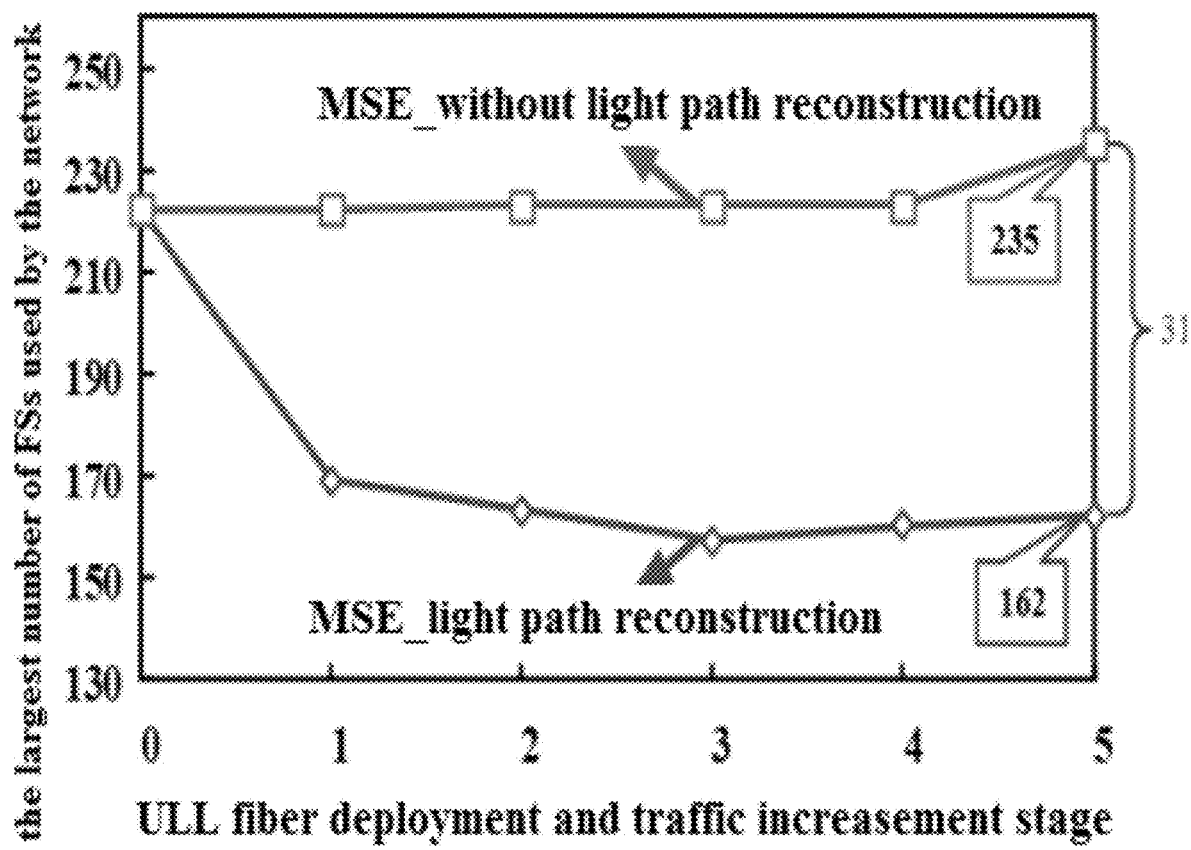
FIG. 5 is a diagram showing the difference in performance between the scenario with light path reconstruction and the scenario without light path reconstruction in a USNET network according to a preferred embodiment of the present invention.

Scenario II: in establishing a new light path, the network is permitted to reconstruct the light path that has been previously established. To further improve the spectrum efficiency, the service traffic on all the old light paths is permitted to be reallocated in establishing the new light path in the new phase. To this end, all the light paths from the previous phase will be released and these traffic demands are combined with traffic demands from the current phase, then light path configuration will be made jointly. As the MSE strategy has the best performance, the MSE algorithm is used for evaluating the results between the scenario with old light path reconstruction and the scenario without old light path reconstruction. FIGS. 4 and 5 show the difference in results between the scenario with old light path reconstruction and the scenario without old light path reconstruction. It is noted that, compared with the scenario where light path reconstruction is prohibited, reconstruction of the light path for previous service traffic can significantly improve spectrum utilization efficiency of the network, by up to 67% and 31% in n6s9 and USNET respectively.

According to the present invention, network performance can be improved to the greatest extent. During ultra-low loss fiber upgrade, if the service traffic that has been previously allocated with a light path is periodically reallocated, a great amount of spectrum resource can be saved in the network.

[3] Poggiolini P, Bosco G, Carena A, et al. The GN-model of fiber non-linear propagation and its applications[J]. Journal of lightwave technology, 2013, 32(4): 694-721.

[4] Cai A, Shen G, Peng L, et al. Novel node-arc model and multi-iteration heuristics for static routing and spectrum assignment in elastic optical networks[J]. Journal of Lightwave Technology, 2013, 31(21): 3402-3413.

The embodiments described above are only preferred embodiments for fully explaining the present invention, and the scope of protection of the present invention is not limited thereto. Any equivalent substitution or change made by those skilled in the art on the basis of the present invention shall fall within the scope of protection of the present invention. The scope of protection of the invention is defined by the claims.

What is claimed is:

1. A fiber deployment method, comprising:
S10: traversing all single-mode fiber links and selecting a link for ultra-low loss fiber upgrade with the objective of minimizing the maximum number of frequency slots used in the whole network; and
S20: when both an ultra-low loss fiber and a single-mode fiber satisfy the service demand, using spectrum resources in the single-mode fiber,
wherein the step S20 comprises:
S21: selecting a modulation format m from a modulation format set M;
S22: calculating the number of frequency slots required for establishing a light path based on m and creating a Slot window plane (SWP) list; for each SWP list, adding an idle single-mode fiber as a virtual link; and if the single-mode fiber on a certain link is not idle, then adding an idle ultra-low loss fiber on this link as a virtual link;
S23: finding a router R in each SWP, and if there is R≠NULL, then entering the step S24;
S24: calculating the OSNR value of the R, and if the OSNR value of R satisfies the OSNR threshold defined by the current modulation format m, letting $R_*$=R and proceeding to the step S26, otherwise checking whether there is a coexisting idle ultra-low loss fiber on the link in which the single-mode fiber on the router R is situated, and if so, replacing the single-mode fibers on R one by one with the ultra-low loss fibers and calculating the updated OSNR value of R after each replacement, and if after a certain replacement step, the OSNR value of R satisfies the OSNR threshold of the modulation format m, stopping the replacement and letting $R_*$=R, and then proceeding to the step S26; if all the idle ultra-low loss fibers in the current SWP list have been replaced, but the OSNR value of R still does not satisfy the OSNR required by the modulation format m, then proceeding to the next SWP list; and if no available R is found in any of the SWP lists, then proceeding to the step S25;
S25: determining whether m is the last modulation format in M, and if so, proceeding to the step S26, otherwise updating m to the next modulation format in M and returning to the step S22; and
S26: if $R_*$≠NULL, then establishing a light path around $R_*$, otherwise blocking the service request.

2. The fiber deployment method of claim 1, wherein the step S10 comprises:
S11: traversing all the single-mode fiber links, adding for simulation an ultra-low loss fiber on each single-mode fiber link to be upgraded, and calculating the maximum number of frequency slots; and
S12: based on all the traversal results, selecting the single-mode fiber link having the lowest maximum number of frequency slots for preferential ultra-low loss fiber upgrade.

3. The fiber deployment method of claim 1, wherein the step S23 comprises:
in each SWP, finding the router R by using the shortest routing algorithm at the search cost of 1/OSNR value for each virtual link.

4. The fiber deployment method of claim 1, wherein the OSNR is calculated by the equation of:

$$OSNR = \frac{P_{TX}}{P_{ASE} + P_{NLI}}$$

where $P_{TX}$ is the optical channel signal transmit power, $P_{ASE}$ is the ASE noise and $P_{NLI}$ is the noise produced by nonlinear effects.

5. The fiber deployment method of claim 1, wherein the modulation format set M∈{64-QAM, 32-QAM, 16-QAM, 8-QAM, QPSK, BPSK}.

6. An electronic device comprising: one or more processors, a memory, and one or more programs stored in the memory and configured to be exerted by the one or more processors to perform the fiber deployment method of claim 1.

* * * * *